United States Patent [19]

Yasunaga

[11] Patent Number: 4,633,925
[45] Date of Patent: Jan. 6, 1987

[54] METHOD OF PRUNING TREE AND TREE PRUNING MACHINE

[75] Inventor: Suezaki Yasunaga, Yame, Japan

[73] Assignee: Kaisei Kogyo Corporation, Kumamoto, Japan

[21] Appl. No.: 759,031

[22] Filed: Jul. 25, 1985

[30] Foreign Application Priority Data

Oct. 8, 1984 [JP] Japan .................. 59-211816

[51] Int. Cl.⁴ .......... B27L 1/00; A01G 23/02
[52] U.S. Cl. .................. 144/343; 144/2 Z; 144/356
[58] Field of Search .............. 144/2 Z, 3 D, 338, 343, 144/356, 357

[56] References Cited

U.S. PATENT DOCUMENTS

| 3,030,986 | 4/1962 | Longert | 144/2 Z |
| 3,356,113 | 12/1967 | Perugia | 144/2 Z |
| 3,385,332 | 5/1968 | Otterbach et al. | 144/2 Z |
| 3,451,448 | 6/1969 | Michener | 144/2 Z |
| 3,454,058 | 7/1969 | Feno | 144/2 Z |
| 3,457,973 | 7/1969 | Meier | 144/2 Z |
| 3,545,509 | 12/1970 | Baxter, Jr. | 144/2 Z |
| 4,527,603 | 7/1985 | Hori | 144/2 Z |

Primary Examiner—W. D. Bray
Attorney, Agent, or Firm—Townsend and Townsend

[57] ABSTRACT

This invention relates to a method of pruning a tree with a tree pruning machine having a body, elevating wheels, a power unit for driving the wheels, and a cutting unit carried on the body comprising temporarily stopping the drive of the elevating wheels in a tree climbing direction when detecting a branch of the tree with a sensor of the branch disposed at the top of the cutting unit. A tree pruning machine comprising a body, elevating wheels, a cutting unit carried on said body, an engine for driving the wheels and the cutting unit, a sensor disposed on the top of the cutting unit for detecting branches, and a power interrupting unit responsive to the sensor for temporarily stopping the drive of the wheels in a tree climbing direction. The drive of the wheels in the tree climbing direction is not only stopped, but a speed shifting transmission is arranged in the transmission path to the wheels which rotates the wheels in the tree descending direction, thereby obtaining the similar effect and advantages. Thus, the top of the cutting unit is prevented from becoming jammed between the branches and stopping normal climbing of the pruning machine.

2 Claims, 27 Drawing Figures

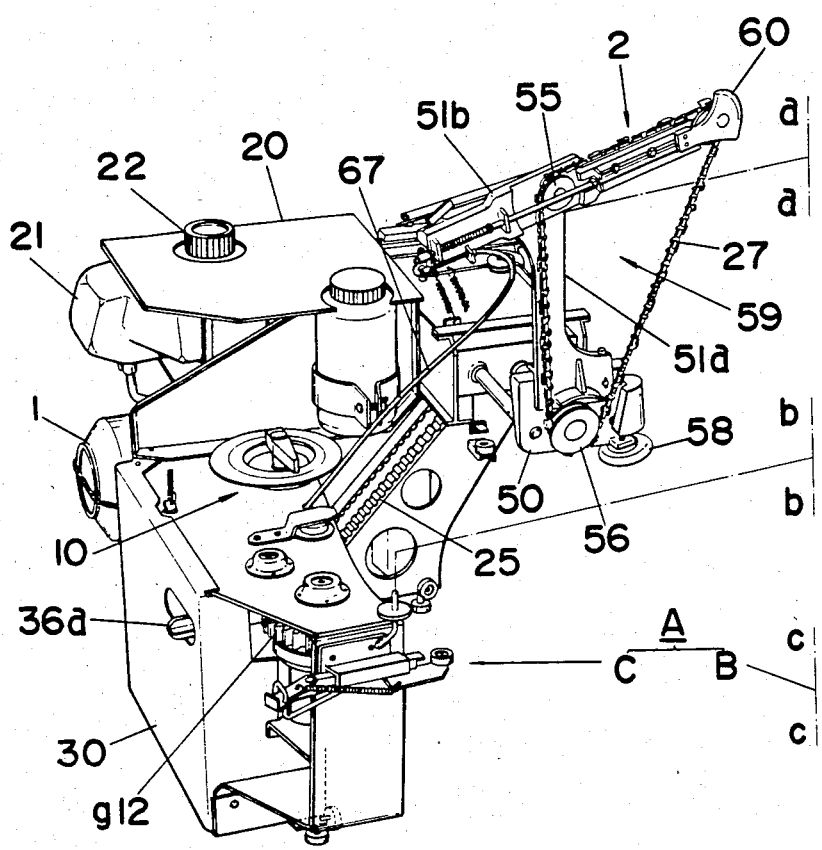
FIG.1-(A)

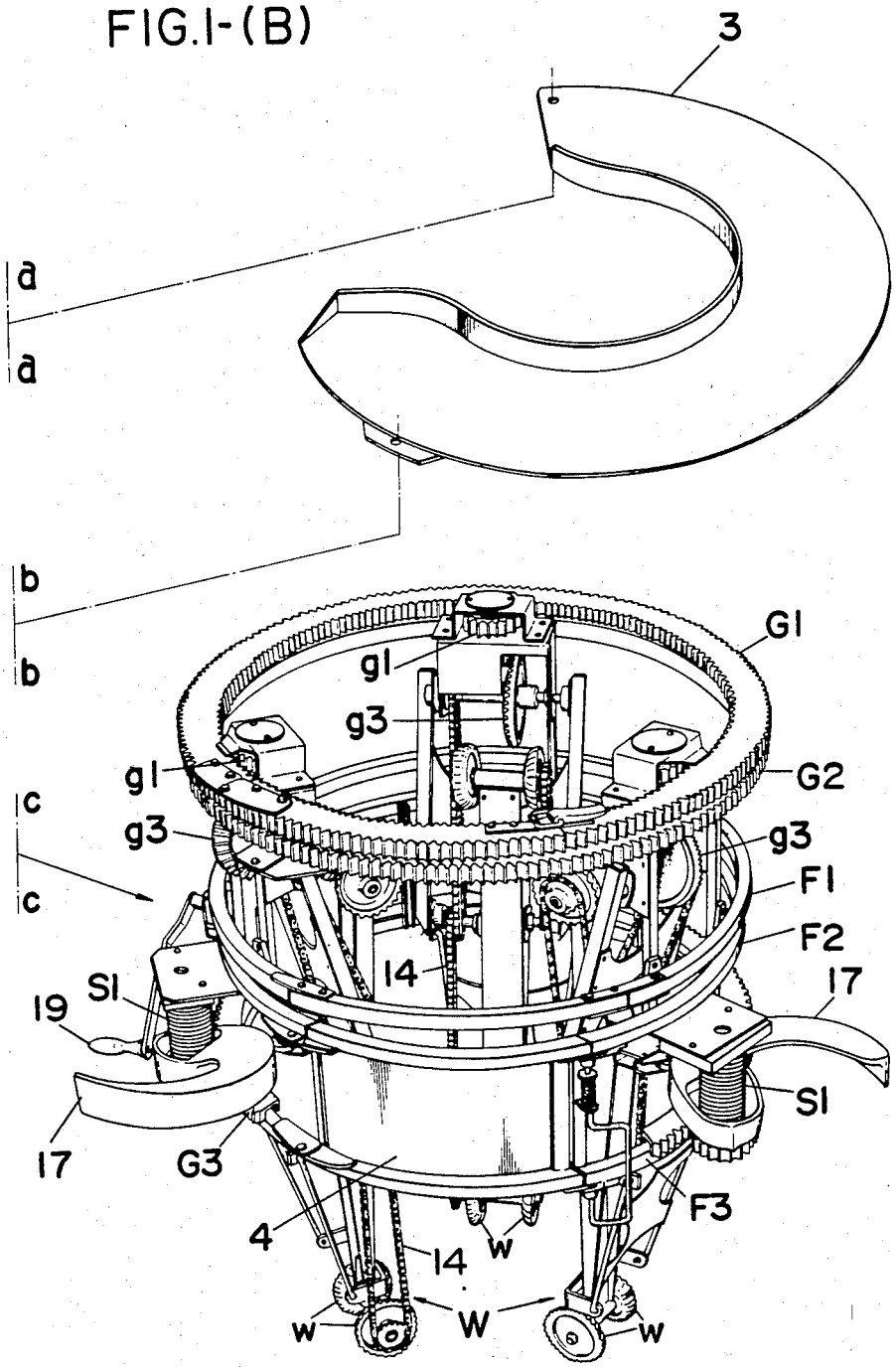

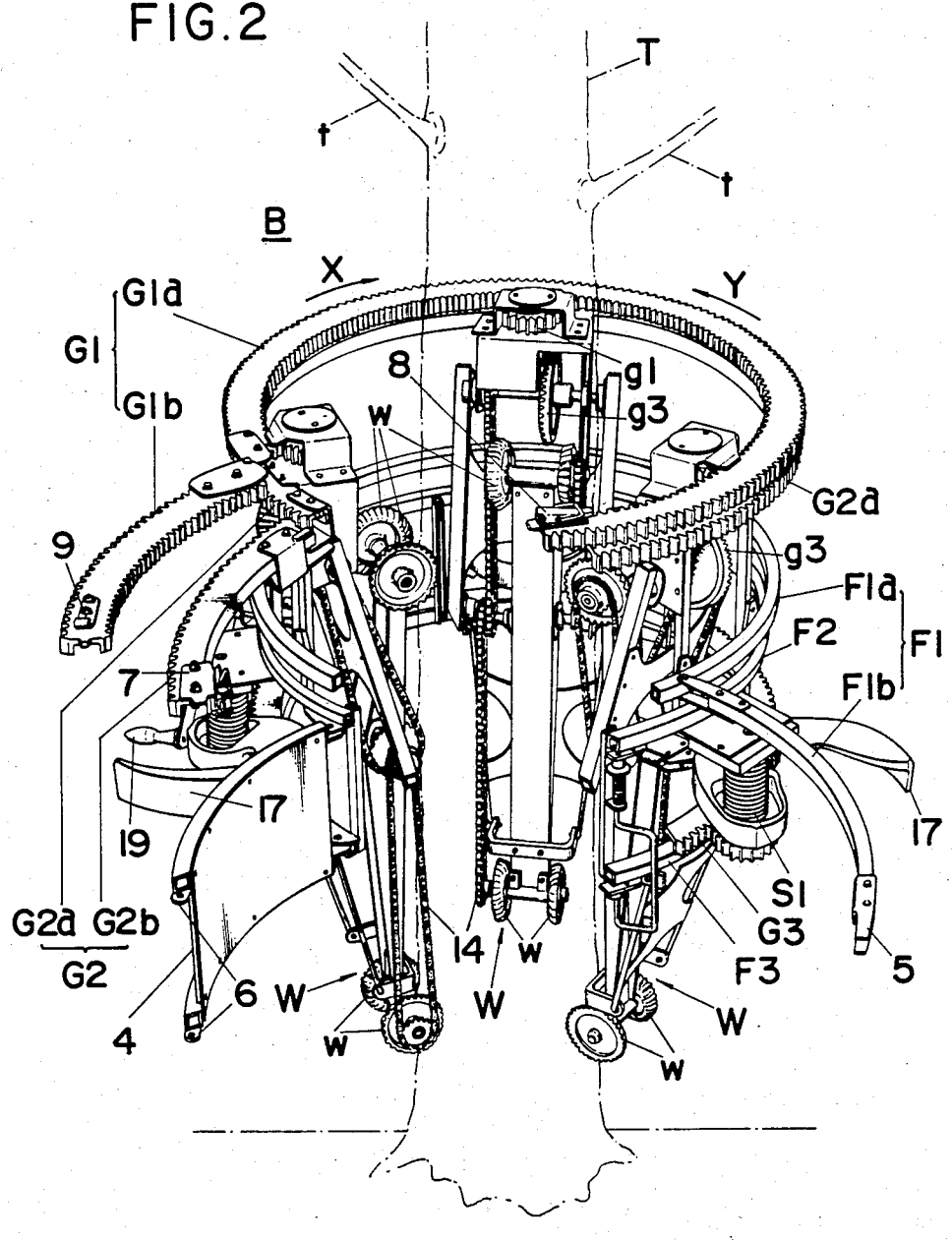

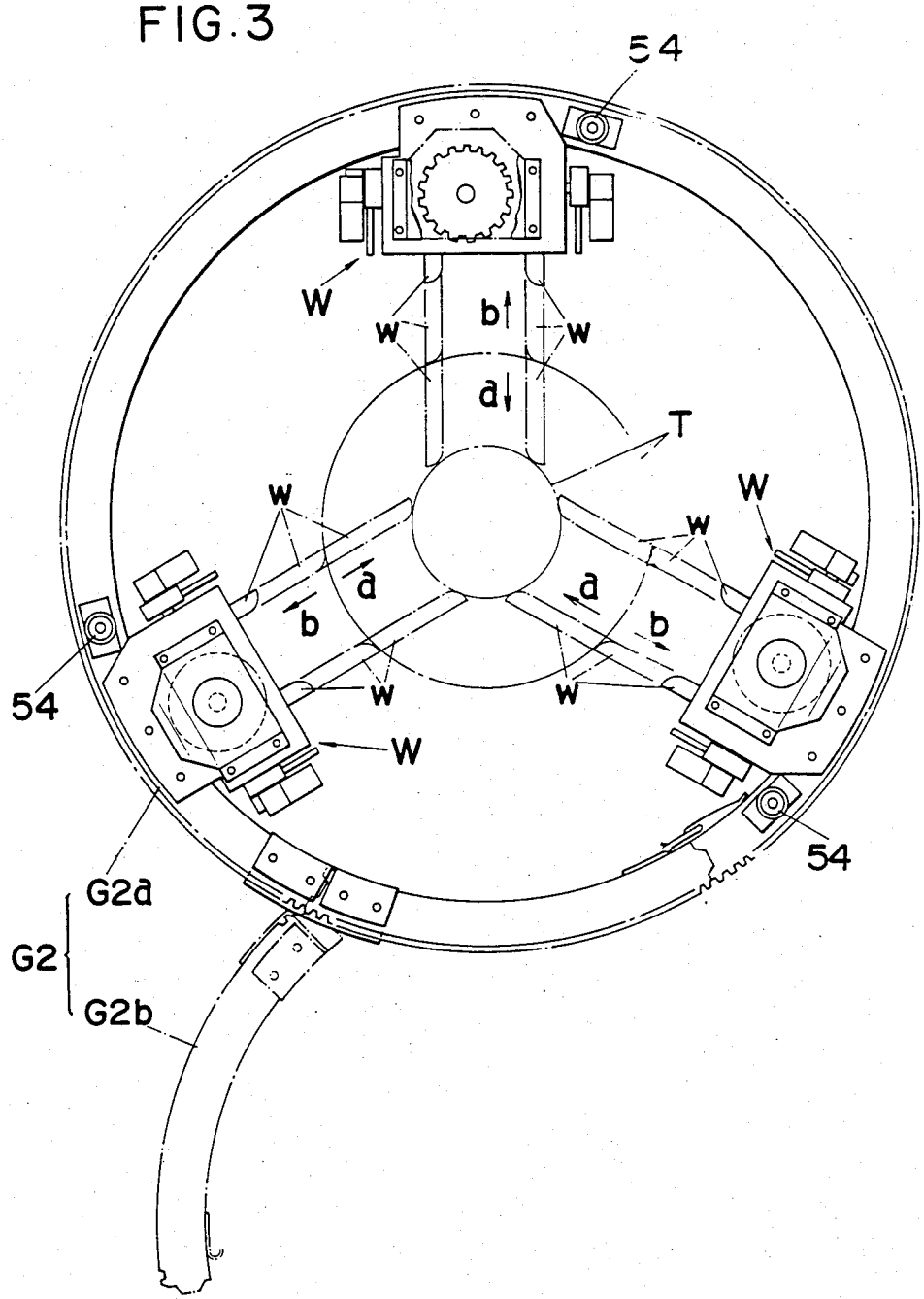

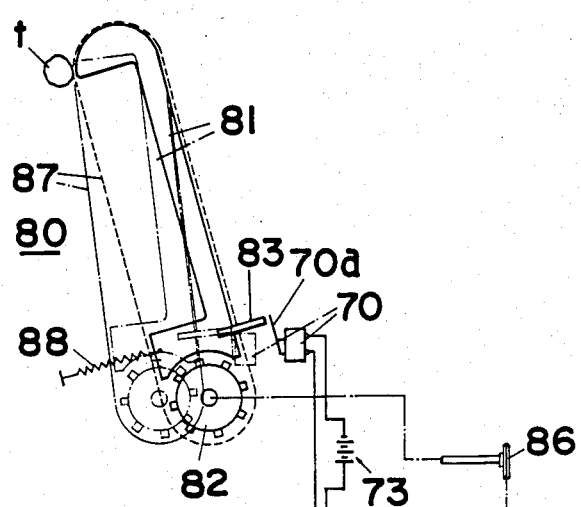
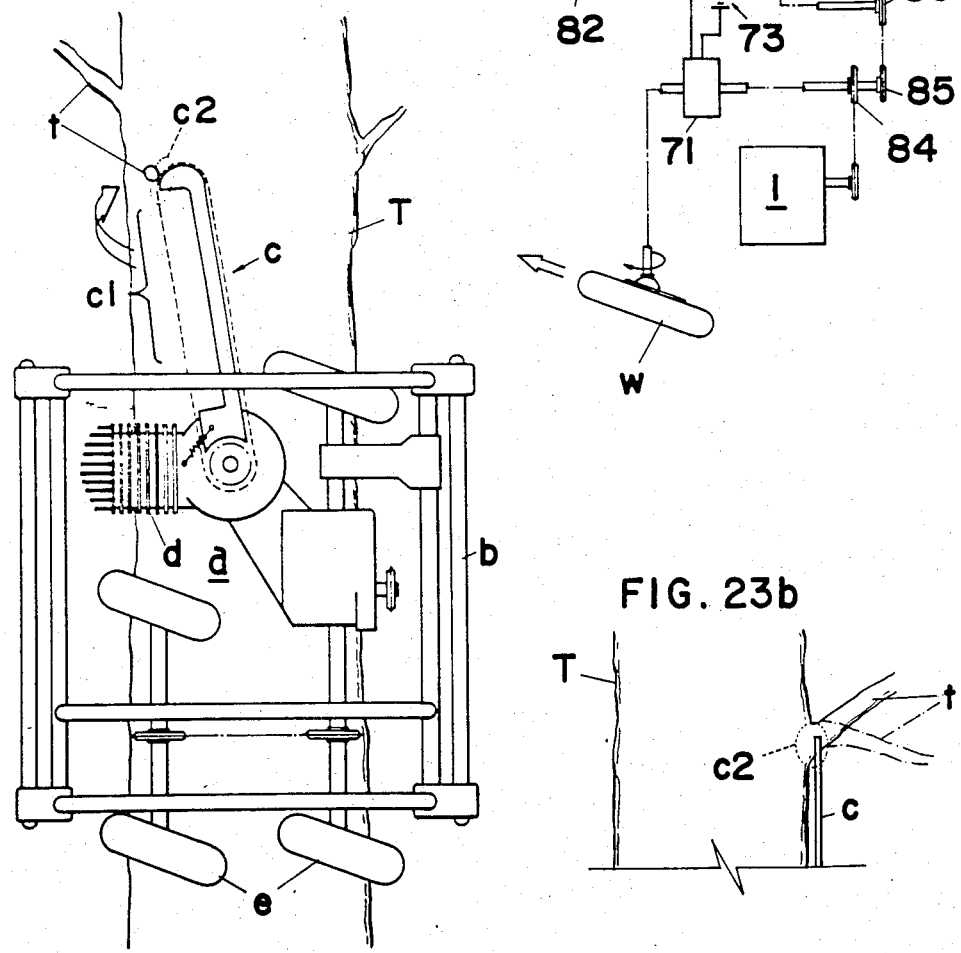

METHOD OF PRUNING TREE AND TREE PRUNING MACHINE

BACKGROUND OF THE INVENTION

1. Field of the Invention:

This invention relates to a tree pruning machine for cutting branches of a standing tree while climbing the tree and, more particularly, to a tree pruning machine of the type wherein a sensor detects a branch contacting the top of a cutting unit and prevents the top of the cutting unit from being interposed in the branches by temporarily stopping the drive of the elevating wheels.

2. Description of the Relevant Literature:

As shown in FIG. 23(a), a tree pruning machine a has a body b and a cutting unit c carried on the body b. By driving elevating wheels e with an engine d, the pruning machine a spirally climbs the tree T and cuts branches t with cutting unit c. The branch cutting force of the center cl of the cutting unit c is relatively large, but the branch cutting force of the top c2 of the unit c is small. When the branches are being cut by cutting c, a branch t tends to frequently make contact with the top c2 of the unit c. In this case, the top c2 may simply cut the branch t, but since the cutting force of the top c2 for cutting the branch t is small, the top c2 frequently is unable to cut the branch t.

FIG. 23(b) illustrates a situation where the top c2 of the cutting unit 2 cannot cut the branch t as described above. When the top c2 of the unit 2 contacts the branch of t, and the lower portion of the branch t is cut, branch t moves downwardly by its own weight as designated by chain lines, and the top c2 is pressed strongly between the cut portions of the branch t so that the branch t cannot be cut or the load on the engine d becomes excessive and causes the engine to stop. If the top c2 of the cutting unit 2 becomes jammed between the branches t so that the pruning machine cannot continue climbing the tree T, the wheels e may continue to rotate while maintaining contact pressure with the surface of the tree T and damage the bark of the tree T.

SUMMARY OF THE INVENTION

An object of this invention is to provide a method for pruning a tree by preventing the top of a cutting unit from being interposed between the branches of the tree, and a tree pruning machine therefor.

According to this invention, a sensor is provided for detecting contact between a branch and the top of a cutting unit. When the sensor contacts the branch, the drive of the elevating wheels is temporarily stopped thereby preventing the top of the cutting unit from being interposed between the branches of the tree.

The foregoing objects as well as the fundamental features of the invention will become more fully apparent and more readily understandable by the following description and the appended claims when read in conjunction with the accompanying drawings.

BRIEF DESCRIPTION OF THE DRAWINGS

FIGS. 1-(A) and 1-(B) are perspective exploded views of an embodiment of a tree pruning machine according to this invention.

FIG. 2 is a perspective view of the body of the pruning machine;

FIGS. 3 and 4 are plain views showing a wheel unit;

FIG. 22 is a side view of still another embodiment of a tree pruning machine according to the invention; and FIGS. 23(a) and 23(b) are front and partial side views of a conventional tree pruning machine.

DETAILED DESCRIPTION OF THE PREFERRED EMBODIMENTS

Figure 4:
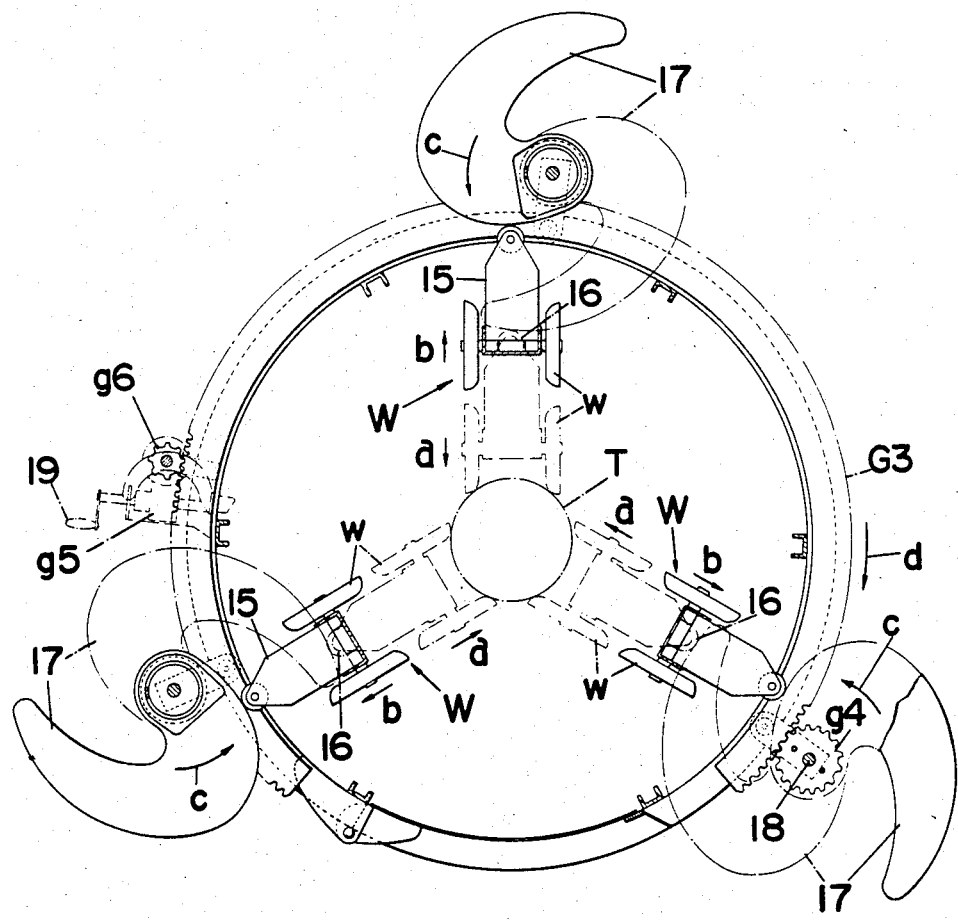

An embodiment of this invention will be described in detail with reference to the accompanying drawings.

FIGS. 1-(A) and 1-(B) are perspective exploded views of an embodiment of a tree pruning machine according to this invention. The tree pruning machine A comprises an elevating body B and a rotary device C detachably mounted thereon. The body B has a number of elevating wheels w which rotate along the vertical direction of the standing tree. When the wheels w are driven by an engine 1 carried on the rotary device C, the body B climbs the standing tree.

The rotary device C is detachably mounted on the body B. When the body B climbs the tree, a cutting unit 2 having a chainsaw 27 cuts branches projecting from the surface of the tree near the trunk while rotating around the body B.

A cover plate 3 is detachably mounted on the rotary device C. When pruning machine A cuts branches while climbing the tree, the cover plate 3 prevents the branches cut by the cutting unit 2 from dropping into and damaging the rotary device C and the body B.

The engine 1, mounted on rotary device C, drives the wheels w of the body B and the cutting unit 2 of the rotary device C, so that the pruning machine A cuts the branches while slowly climbing the standing tree. When the pruning machine A has completed a prescribed amount of pruning, the machine A rapidly descends vertically along the standing tree.

To cut the branches of the standing tree while reliably climbing the tree, the tree is disposed at the center of pruning machine A. This is accomplished by the following three mechanisms:

(1) A linkage mechanism mounts the wheel units on the body B so as to allow radial movement with respect to the axis of the tree.

(2) An interlocking mechanism interlocks the wheel units so that each wheel unit simultaneously moves the same radial distance.

(3) A pressure equalizing mechanism having springs ensures that the wheel units contact the surface of the tree with equal pressure.

These three mechanisms will now be described in detail with reference to the accompanying drawings.

FIG. 2 is a perspective view of the body B disposed on a standing tree T illustrated in phantom. The body B has as main frames circular frames F1, F2, and F3, on which a variety of components to be described below are respectively mounted. Arranged at the uppermost portion of the body B is a movable large ring gear G1 formed with teeth on both inner and outer peripheral surfaces. When the pruning machine A climbs the tree T, the ring gear G1 turns in the direction of arrow X by the drive of the engine 1 and transmits a normal rotation to the respective wheels w. When the pruning machine A descends the tree T, the ring gear G1 turns in the direction of arrow Y which in turn rotates the wheels w in the reverse direction.

Disposed directly under the ring gear G1 on body B is a stationary large ring gear G2 formed with teeth on its outer peripheral surface. The ring gear G2 is mounted securely on the frame and does not turn in the direction of the arrows X and Y as does the ring gear G1. When the body B climbs the tree T, the rotary device C cuts the branches t with the cutting unit 2 while rotating along the ring gear G2 in such a manner that ring gear G2 becomes the rotation guiding locus of the rotary device C.

A large arcuate interlocking ring gear G3 is disposed directly above the frame F3 and surrounds the tree T. Ring gear G3 acts as an interlocking unit for the wheel units W in order to hold the tree at the center of the body B by simultaneously moving the three elevating wheel units W radially of the tree T by equal amounts. The tree T is thus located at the centers of the frames F1, F2, and F3 and the gears G1, G2, and G3 when the body B is mounted to the tree T.

The frame F1 has a mainframe F1a and a subframe F1b pivotably connected at an end thereof. A laterally openable plate 4 is pivotally mounted at the frame F2 and F3. Plate 4 acts as a coupling member of frames F2 and F3 to rigidly reinforce the frames F2 and F3, thereby preventing the frames F2 and F3 from twisting or deforming. Ring gears G1 and G2 respectively having main gears G1a, G2a, and subgears G1b, G2b pivotally connected at respective ends thereof. When the body B is mounted to the tree T or removed from the tree T, frame F1b, plate 4, and gears G1b, G2b are opened as shown in FIG. 2 to establish an opening capable of receiving the tree T. After the tree T is passed through the opening and disposed at the center of the body B, a stopper 5 of subframe F1b, a stopper 6 of plate 4, and the stoppers 8 and 9 of subgears G1b, G2b, respectively, are closed as shown in FIG. 1.

The structure of the wheel units W including the linkage mechanism for moving the wheel units W radially with respect to the axis of tree T, the interlocking mechanism for ensuring equal radial movement by each wheel unit W and the pressure equalizing mechanism for ensuring uniform contact pressure between wheel units W and the surface of the tree T will now be described in detail with reference to FIGS. 3–6. Although three sets of the wheel units W are provided, only one of them will be described since all are constructed in the same way.

Each wheel unit W has an erected rectangular plate 11 and four wheels w, two of which are respectively journaled to upper and lower ends of the plate 11. Plate 11 is pivotally mounted to lower ends of supporting rods 12 and 13 which in turn are pivotally coupled at their upper ends to the frame. This mounting scheme allows plate 11 to move forwardly and reversely in radial directions a and b with respect to the tree T. When the plate 11 is moved forwardly in the direction of arrow a, the wheels w contact the surface of the tree T, and when the plate 11 is moved in the direction of arrow b, the wheels w are separated from the surface of the tree T.

Body B has a small gear g1 engaged in mesh with the inside of the ring gear G1. Rotation of small gear g1 is transmitted to bevel gears g2, g3, and a chain 14. The rotation of the engine 1 is thus transmitted through the gears G1, g2, g3, and the chain 14 to the respective wheels w. The drive mechanism for the wheels w will be described in detail later.

A washer 15 projects from the rear of plate 11, and a bearing 16 is coupled to the end of washer 15. A cam 17 is rotatably mounted on a shaft 18 which in turn is mounted to a gear g4 which meshes with the ring gear G3. A coiled spring S1 is mounted on the shaft 18 to bias cam 17 counterclockwise in the direction of arrow c in FIG. 4. The three cams 17 are thus interlocked to each other through the ring gear G3 and the gears g4. When any of the three cams 17 is rotated, shaft 18 transmits the rotation to gears g4. The ring gear G3, which meshes with gears g4, rotates in the direction of arrow d, and the other two gears g4 meshing with ring gear G3 rotated in the same direction and by the same amount, and this rotation is transmitted to the other two cams 17 by respective shafts 18.

Figure 5:
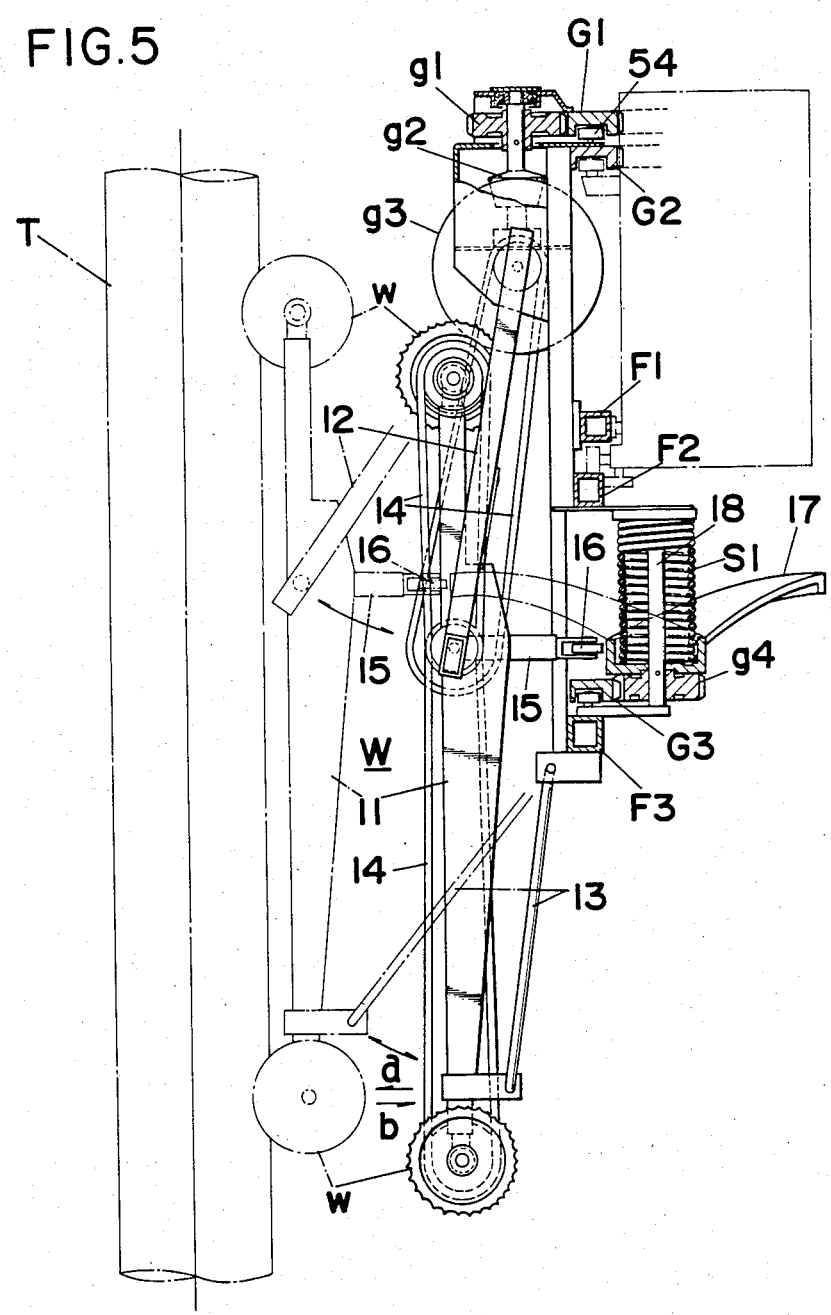
FIGS. 5 and 6 are side and front views of the wheel unit.
Figure 6:
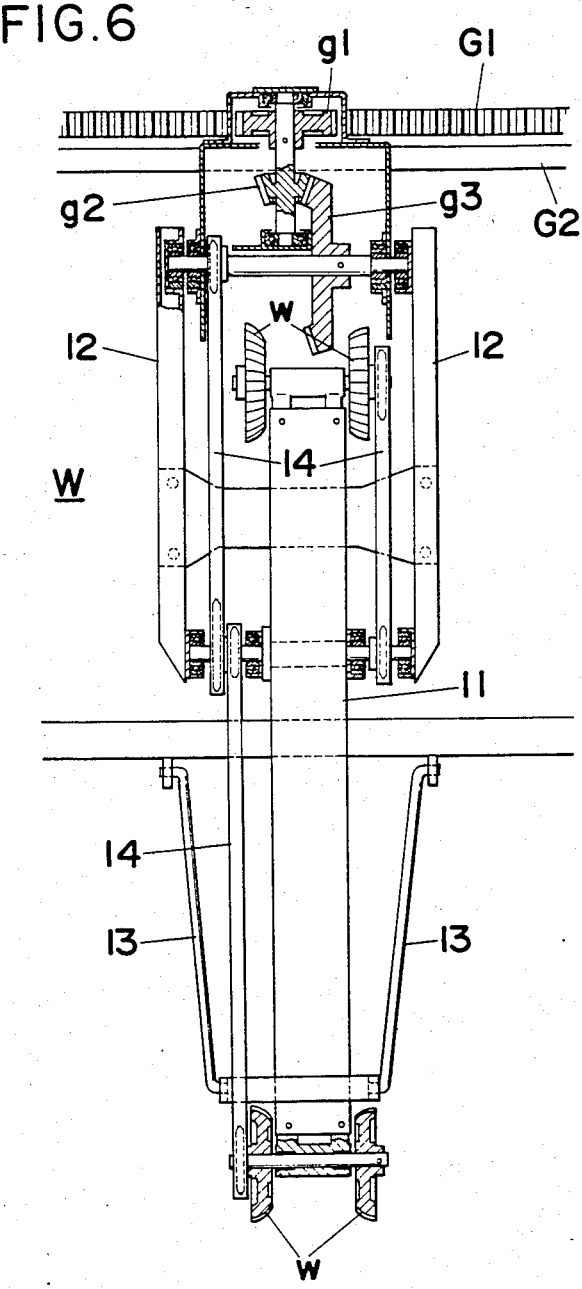

In each wheel unit W, the weight of rods 12 and 13 tend to hold each wheel unit w in the position designated by solid lines in FIG. 5. As each cam 17 rotates, its outer peripheral edge contacts each bearing 16, and each wheel unit W moves in the radial direction a or b. The ring gears G3, the gears g4, and the cams 17 interlock the wheel units W to each other and ensure that the wheel units W move equally in the radial direction a or b with respect to the tree T. Tree T is thus always stably held at the center of tree pruning machine A.

A handle 19 is used for manually rotating the cams 17 when the body B is mounted on the tree T. A gear g5, mounted coaxially on the handle 19, meshes with a gear g6 which in turn meshes with the ring gear G3. When the handle 19 rotates, the gear g6 rotates. Gear g6 causes ring gear G3 to rotate, and the three small gears g4 meshing with gear G3 rotate the cams 17.

Accordingly, whenever the body B is to be set to or removed from the tree T, handle 19 is operated to rotate the cams 17 to the position designated by the solid line in FIG. 4 against the tension of springs S1. As a result, the weight of each wheel unit W causes them to move radially outward in the direction of arrow b and remain in the position designated by the solid line in FIG. 5. After the tree T is disposed through the opening at the center of the body B, handle 19 is released and the tension in springs S1 cause cams 17 to rotate counterclockwise in the direction of arrow c in FIG. 4. Cams 17 press against bearings 16 and washers 16, causing the wheel units W to move radially inward toward the tree T (in the direction of arrow a) and the wheels w press against the surface of the tree T with equal pressure. When the gears g6 and G3 are disengaged, the pruning machine A is ready for operation, and when the wheels w are rotated by the engine 1 the body B climbs the tree T.

Typically, tree T will gradually decrease in diameter toward the top. If the tree T decreases in diameter as the pruning machine A climbs the tree T, the wheels w of the respective wheel units W move forwardly in the direction of arrow a under tension of springs S1 to maintain sufficient contact pressure with the surface of the tree T. On the other hand, when tree T gradually increases in diameter as the pruning machine A descends it, wheel units W gradually spread outwardly in the direction of arrow b against the tension of the springs S1, and the wheels w maintain reliable contact pressure with the surface of the tree T.

The operation of the tree pruning machine A will now be described with reference to FIGS. 7–12.

Figure 7:
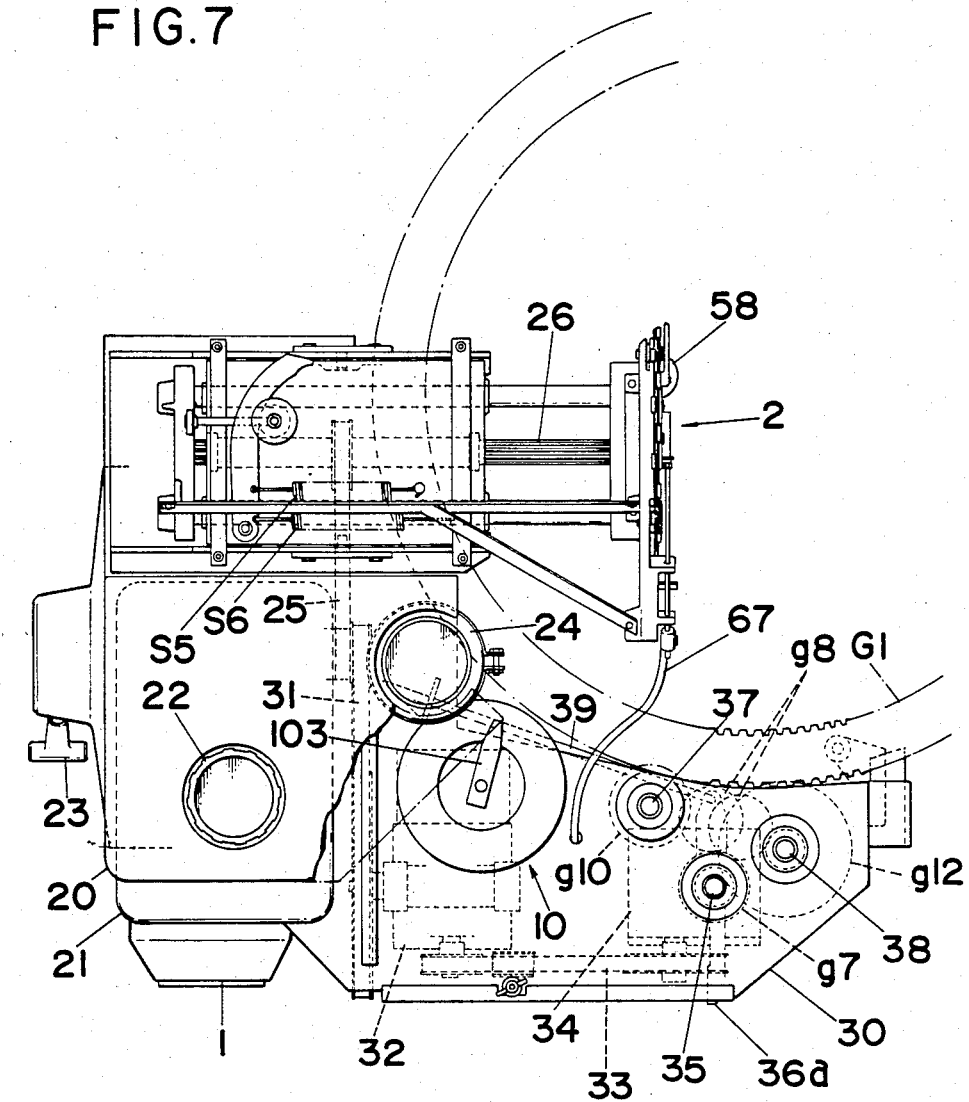
FIGS. 7 and 8 are partial plain and side views of the wheel unit.
Figure 8:
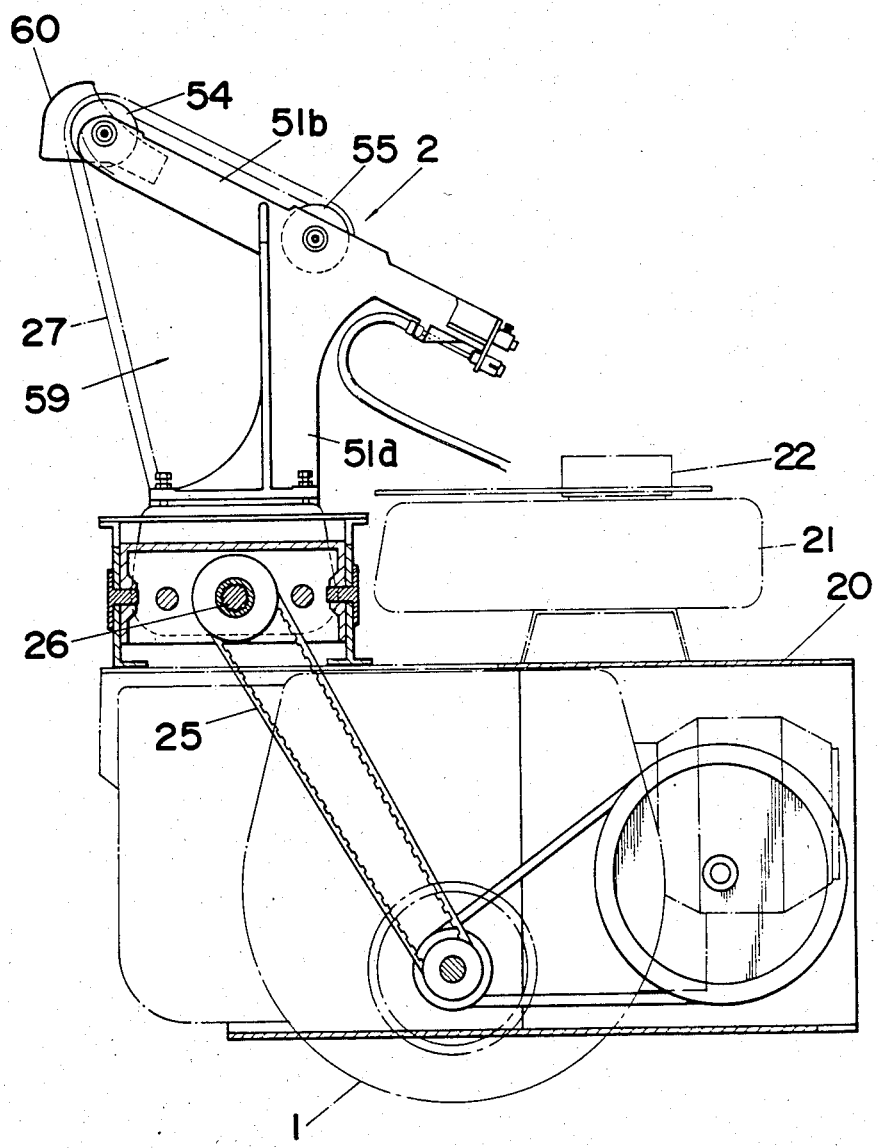

As shown in FIGS. 7 and 8, engine 1 is mounted under a chassis 20. Engine 1 includes a gasoline tank 21 having a cap 22, a lever 23 for starting the engine, and an oil tank 24. Engine 1 drives the elevating wheels w and the cutting unit 2. The power of the engine 1 is transmitted to the cutting unit 2 by a timing belt 25 and a spline shaft 26 which drives a chainsaw 27. Springs S5 and S6 bias the cutting unit 2 toward the tree.

A power transmission mechanism to the elevating wheels w will now be described.

Figure 9:
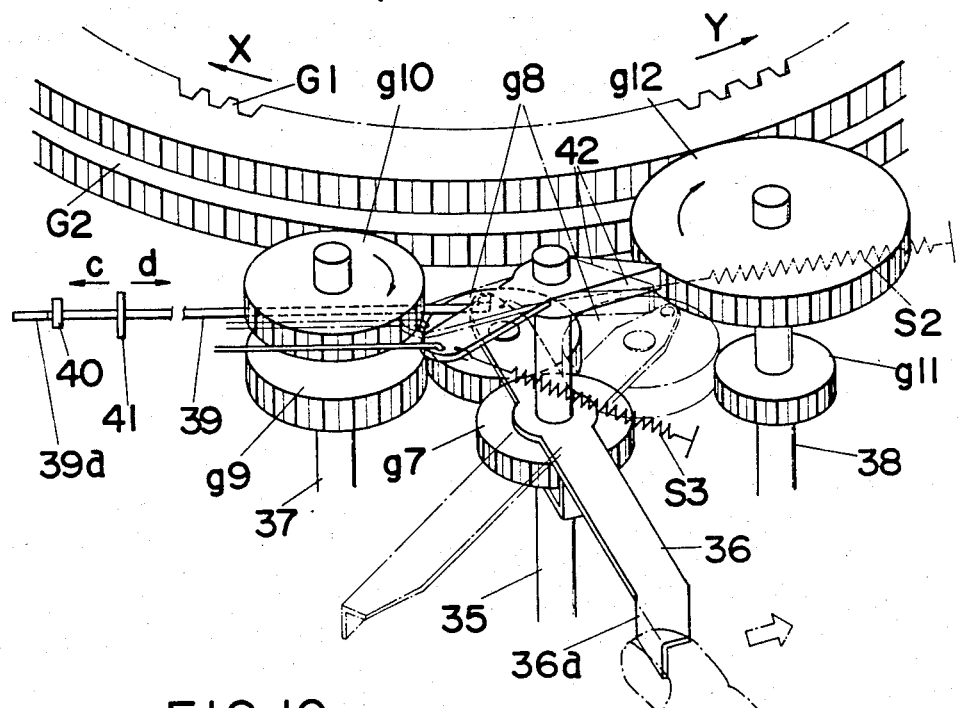
FIGS. 9 and 10 are perspective views of a transmission.

As shown in FIG. 7, rotation of engine 1 is transmitted through a belt 31, a reduction gear 32, a belt 33, and a reduction gear 34 arranged in a box 30. Reduction gear 34 is coupled to a rotational shaft 35 upon which is mounted a gear g7, as shown in FIG. 9. Movably mounted on the shaft 35 directly above the gear g7 is a lever 36 extending to the side of the ring gears G1 and G2. The rear end of the lever 36 comprises an operation unit 36a which is exposed from box 30 (FIG. 1), and which can be operated by the end of a finger. A gear g8 is journaled on the lever 36 and meshes with gear g7 so that engine 1 drives gear g8 through the gear g7. Rotational shafts 37 and 38 are disposed at both sides of the shaft 35, and gears g9 and g10, g11, and g12 are respectively mounted on the shafts 37 and 38. Gear g8 is disposed at the same level as the gears g9 and g11. Gear g10 engages in mesh with the ring gear G2, and the gear g12 engages in mesh with the ring gear G1.

A tension spring S2 is mounted at the end of lever 36 to bias gear g8 toward gear g11. An operation lever 39 is coupled to the end of lever 36 and extends through a guide member 41. As shown in FIG. 9, lever 36 can be rotated counterclockwise against the tension of the spring S2 by pressing a finger against the operation unit 36a. As a result, a projection 39a at the end of rod 39 engages with a projection 40, and the gear g8 meshes with gear g9 and causes gear g10 to rotate clockwise.

A compression spring S3 having lesser tension than spring S2 is mounted at the rear end of an anchoring plate 42 mounted on shaft 35 for biasing plate 42 counterclockwise. Plate 42 rotates together with lever 36, and the end of plate 42 meshes with gear g12 to prevent gear g12 from rotating when gear g8 meshes with gear g9. Since ring gear G2 is non-rotatably fixed to the frame, the rotary device C rotates around the ring gear G2 (i.e., around the tree T) in the direction of arrow X as a result of gear g10 being driven by engine 1 and meshing with the stationary ring gear G2. In other words, the ring gear G2 becomes the locus for rotating the rotary device C around the body B so that rotary device C cuts the branches t projecting from tree T as body B climbs the standing tree T.

Figure 10:
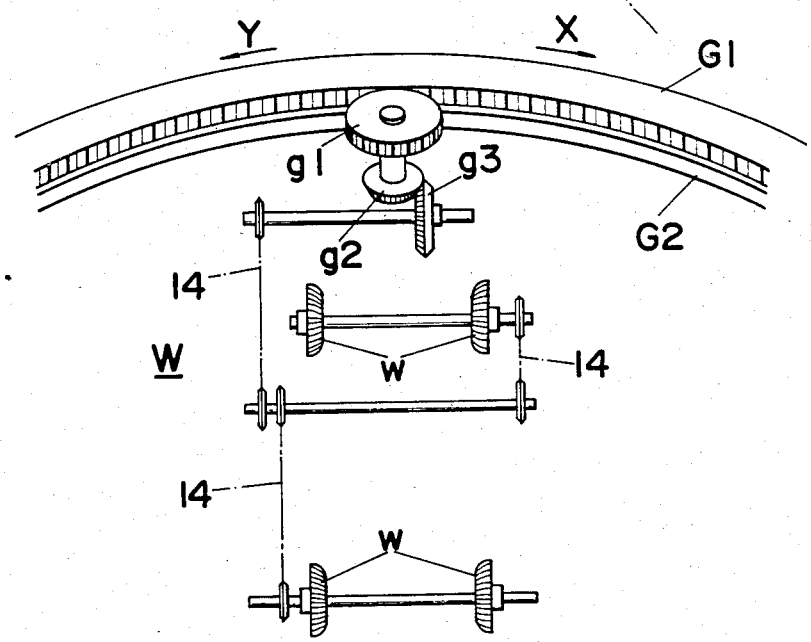

As the gear g10 rotates around the ring gear G2, gear g12 is prevented from rotating by plate 42, as discussed above. Accordingly, ring gear G1, which meshes with gear g12, is towed by gear g12 and rotates in the direction of arrow X around the tree T together with the gear g10. As shown in FIG. 10, rotation of ring gear G1 is transmitted to gear g1 which meshes with the inside of G1. The rotation of gear g1 is transmitted through the bevel gears g2, g3, and the chain 14 to the wheels w. The rotating wheels w, which press against the surface of standing tree T, cause body B to climb the tree T while the rotary device C rotates around the body B and the cutting unit 2 cuts the branches t.

Figure 13:
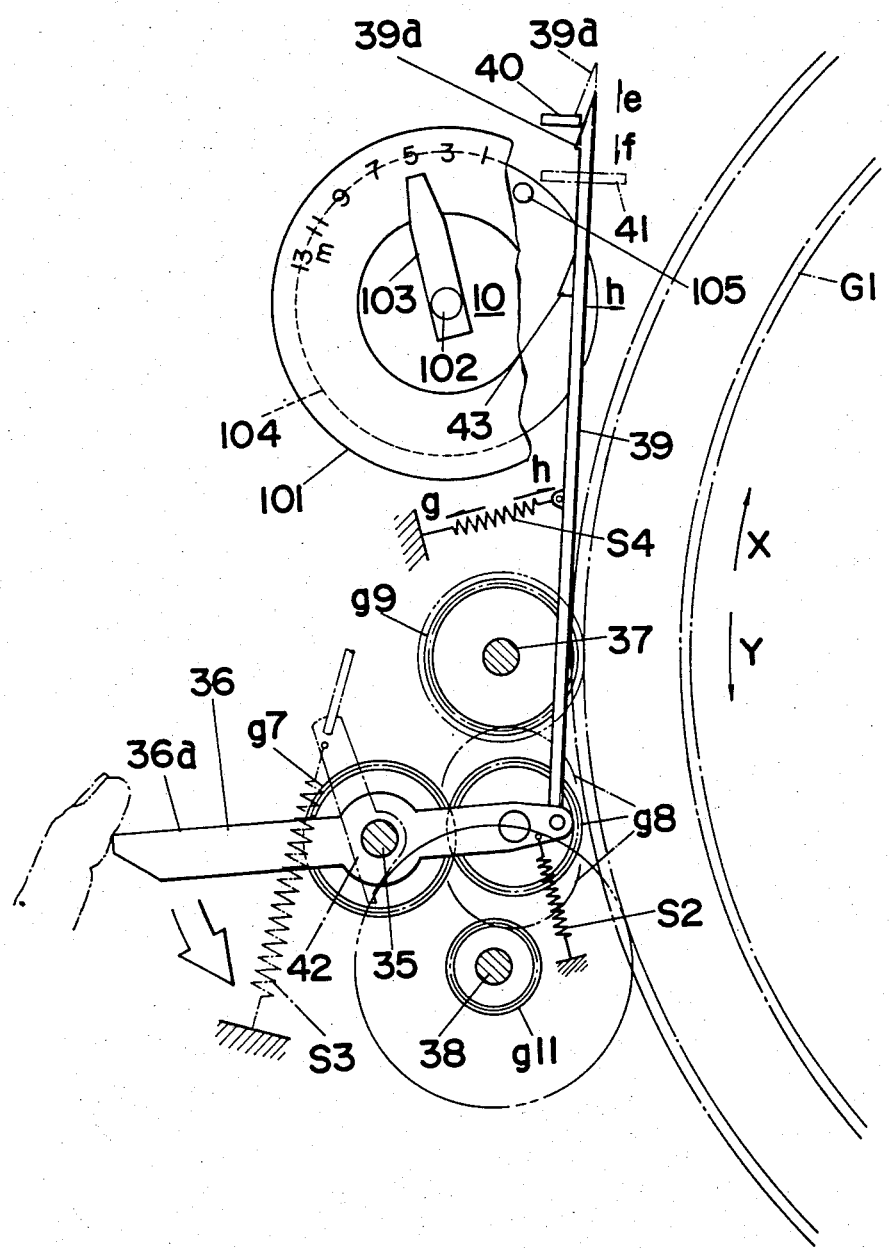
FIG. 13 is a plain view of a climbing height setter.
Figure 14:
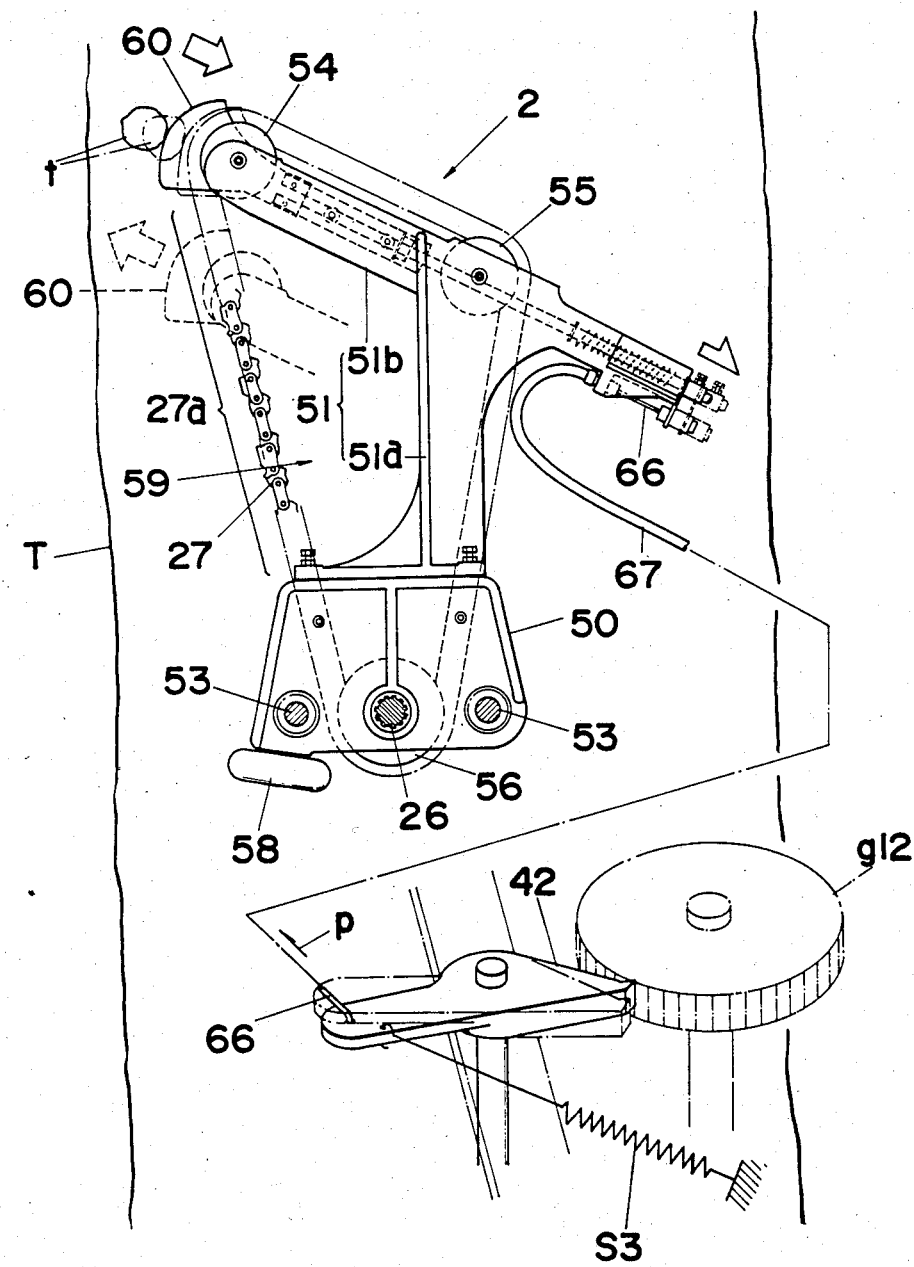
FIGS. 14 and 15 are side views of a cutting unit.
Figure 15:
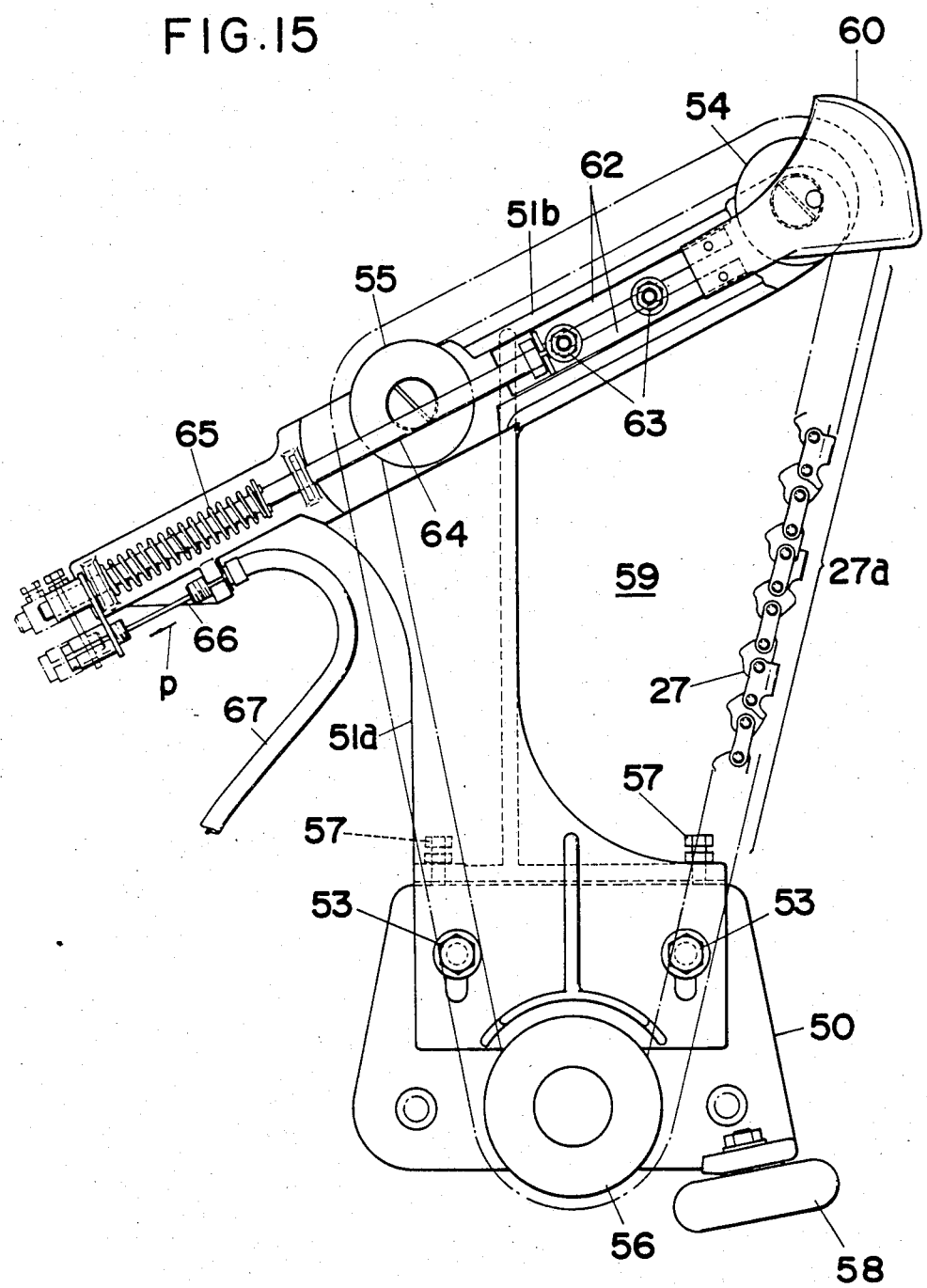
Figure 16:
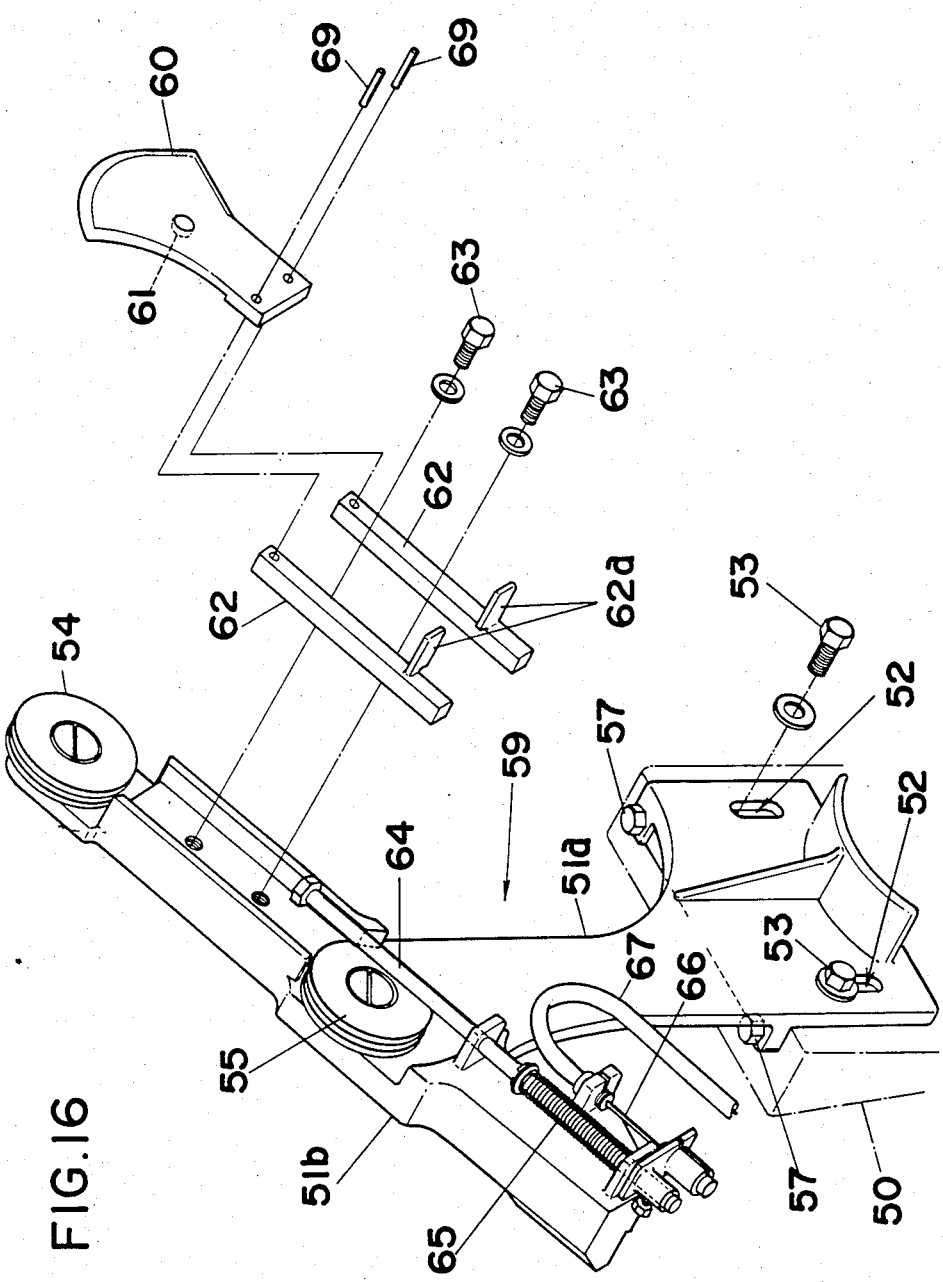
FIG. 16 is an exploded view of the cutting unit.
Figure 17:
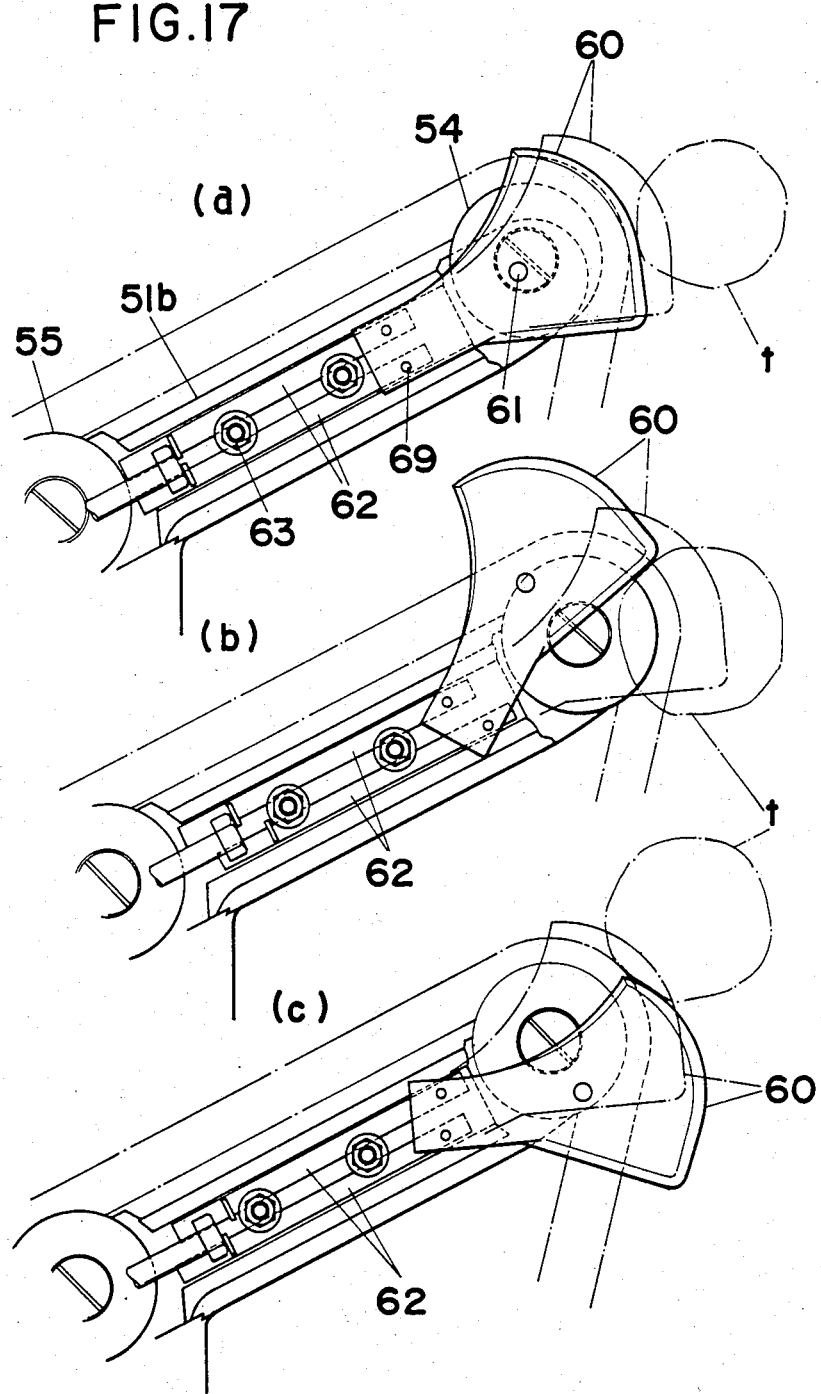
FIGS. 17(a), 17(b), and 17(c) are side views of a sensor.

In operation, the pruning machine A is set to the tree T and the operation unit 36a is pressed to rotate the lever 36 counterclockwise, as shown in FIGS. 9 and 13. Rod 39 moves in the direction of arrow c against the tension of spring S2, and the projection 39a at the end of rod 39 is secured to projection 40 on the frame, causing gear g8 to mesh with gear g9. Accordingly, the rotation of engine 1 is transmitted through belt 25 to the cutting unit 2 and through belt 31 and reduction gears 32, 33, 34 and gear g7. The rotation of gear g7 is further transmitted through gears g8 and g9 to gear g10, and gear g10 rotates in the direction X along the ring gear G2.

Since plate 42 meshes with gear g12, gear g12 does not rotate. Therefore, when gear g10 rotates along the direction of arrow X, causing rotary device C to likewise rotate in the direction of arrow X along the ring gear G2, ring gear G1 is towed by gear g12 to rotate in the direction of arrow X around the tree T. The rotation of the gear G1 is transmitted through the gears g1, g2, g3 and the chain 14 to the wheels w of the respective wheel units W, and the rotation of wheels w causes pruning machine A to climb the tree T at a constant speed.

Figure 12:
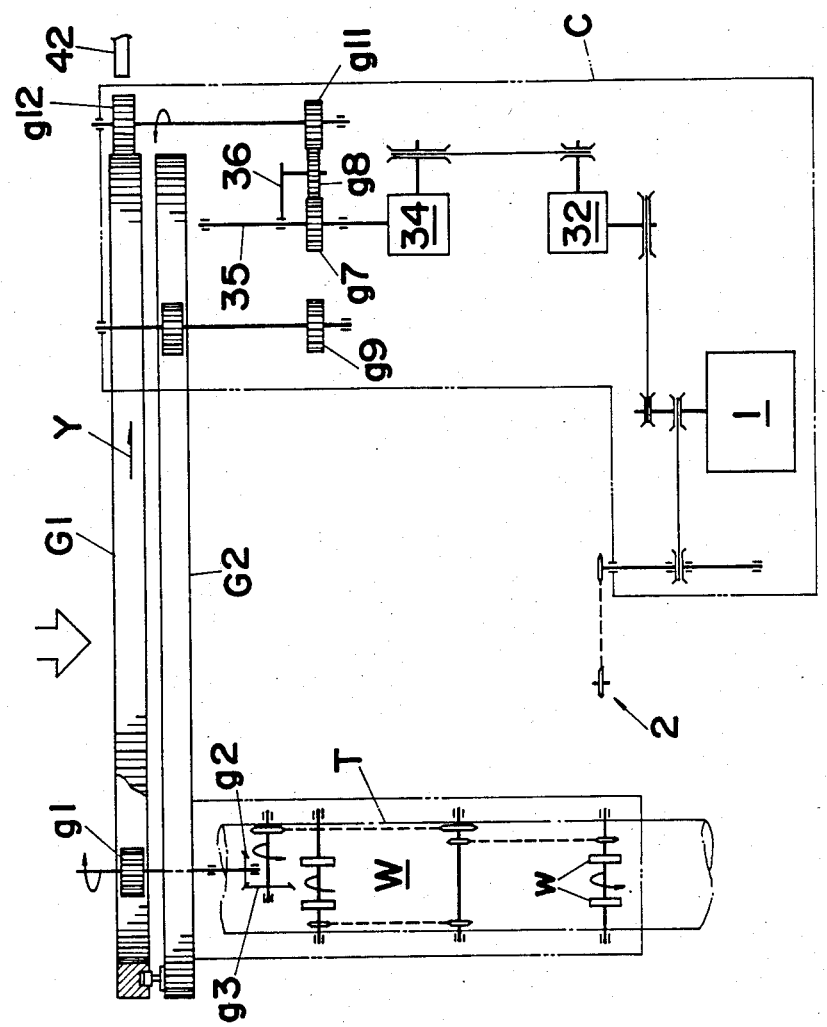

The mechanism for changing the tree pruning machine A from the climbing mode to the descending mode will now be described with reference to FIGS. 12 and 13.

Disposed within box 30 is a timer unit 10 for setting the climbing height of the tree pruning machine A. Timer unit 10 includes a dial plate 101, a dial knob 103 mounted on a rotational shaft 102 at the center of the plate 101, and spiral springs and gears (not shown). Height settings, in meters, are marked by numerals (1–13) on the upper surface of plate 101. Timer unit 10 is typically a spiral spring type clock of well known construction and, since such clocks have a number of spiral springs and gears associated therewith, a detailed description of its structure will be omitted. It is sufficient to say that knob 103 is manually rotated counterclockwise against the tension of one such spiral spring in box 30 and matched to a desired numeral (e.g., 5 meters, as shown), and the knob 103 subsequently slowly rotates clockwise by the tension of the spiral spring.

As discussed above, one end of operation rod 39 is journaled to the end of the lever 36, and the other end of rod 39 has projection 39a extending therefrom. When operation unit 36a is manually operated to move the rod 39 in the direction of arrow e and to secure the projection 39a to the projection 40 on the frame, the gear g8 rotates around the shaft 35 and meshes with gear g9 (designated by a chain line in FIG. 13). Rod 39 is biased in the direction of arrow g toward timer unit 10 by the tension of a spring S4, so the initial coupling of projection 39a to projection 40 is maintained. Normal rotation is transmitted to the wheels w, and the pruning machine A climbs the tree T.

Timer 10 includes a disk 104 having a projection 105 extending from the upper surface thereof. Disk 104 rotates together with knob 103. When knob 103 is rotated to set the desired height and subsequently released, knob 103 and disk 104 rotate slowly clockwise. When the pruning machine A climbs to the set height, projection 105 contacts a projection 43 extending from a side of the rod 39 and pushes the rod 39 in the direction of arrow H. Consequently, projection 39a separates from projection 40 and is pulled by the tension of spring S2 in the direction of arrow f. As a result, gear g8 rotates clockwise around shaft 35 by the tension of spring S2, away from gear g9, and meshes with gear g11. At the same time, plate 42 rotates clockwise together with lever 36, away from gear g12, and gear g12 is allowed to rotate. (See FIG. 9).

Figure 11:
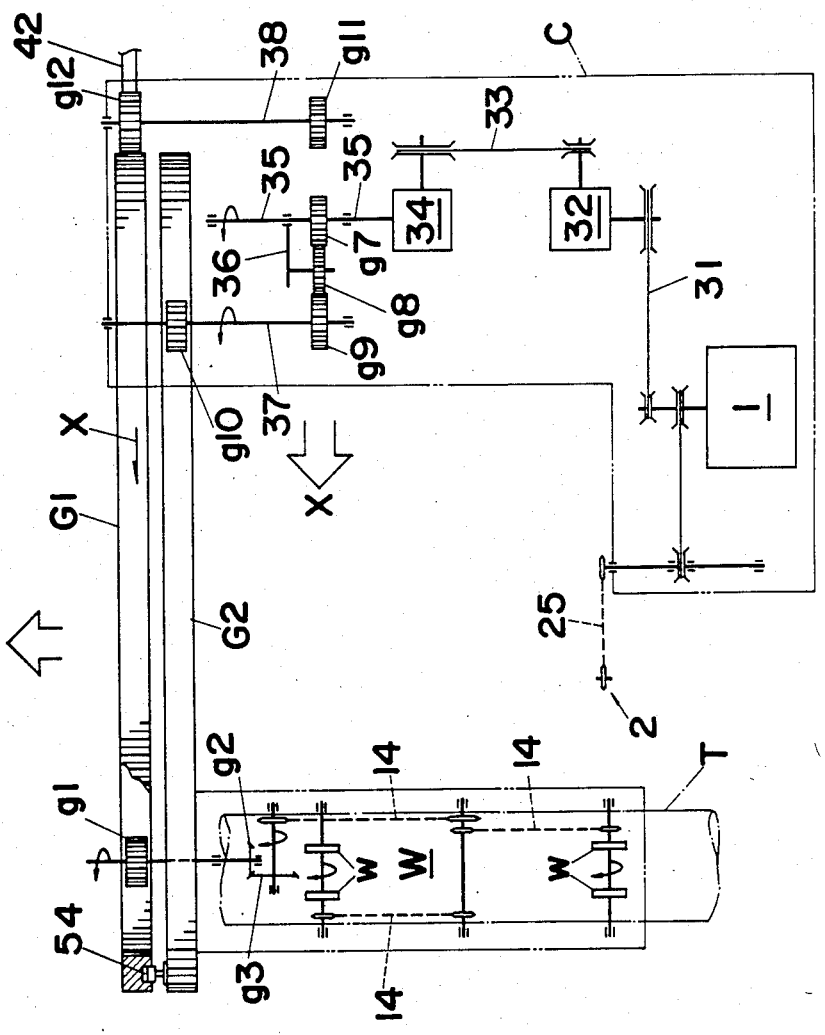
FIGS. 11 and 12 are developed views of the transmission.

Converting the pruning machine A from the climbing mode to the descending mode will now be described with reference to FIGS. 11 and 12.

When gear g8 meshes with gear g9, rotation of engine 1 to wheels w causes pruning machine A to climb the standing tree T. As pruning machine A climbs tree T, projection 105 of the timer unit 10 slowly rotates clockwise, as shown in FIG. 13. When pruning machine A arrives at the height set by the timer unit 10, the projection 105 contacts projection 43 and pushes the rod 39 in the direction of arrow h against the tension of spring S4. When projection 39a clears projection 40, the tension of spring 32 causes rod 39 to move in the direction of arrow f, causing gear g8 to separate from gear g9 and mesh with gear g11. Gear g9 stops rotating, and rotary device C stops rotating around ring gear G2, thereby finishing the cutting of the branches t by the cutting unit 2.

The rotation of the engine 1 is thereafter transmitted through gear g8 to the gears g11 and g12. Gear g12 rotates clockwise, as shown in FIG. 9, and gear g1, which meshes with gear g12, is rotated in the direction of arrow Y. Then, as shown in FIG. 10, gear g1, which meshes with the inside of gear G1, rotates counterclockwise, and this rotation is transmitted through gears g2, g3, and chain 14 to the wheels w. The wheels w rotate in reverse, and the pruning machine A descends the standing tree T.

The number of teeth on gear g11 is less than that of gear g9. Therefore, ring gear G1 rotates considerably faster in the Y direction than in the X direction and drives wheels w considerably faster during descent than during ascent. In other words, gears g8, g9, and g11 also comprise a speed shifting transmission so that the pruning machine A cuts the branches t while slowly climbing the tree T and rapidly descends the tree T after the tree pruning work is finished.

The construction of the cutting unit 2 and the mechanism for preventing the top of the cutting unit 2 from being interposed between the branches t will be described with reference to FIGS. 14–17.

Cutting unit 2 comprises a base 50 and a substantially t-shaped frame 51. Base 50 has a shank contact member 58 mounted at the lower portion thereof. Frame 51 has long mounting holes 52 so that frame 51 may be adjustably mounted on frame 50 with bolts 53. Frame 51 may be elevated with respect to the base 50 in order to adjust the tension of chainsaw 27 by loosening the bolts 53 and selectively adjusting bolts 57.

Frame 51 comprises an upright unit 51a and an oblique unit 51b extending forwardly and upwardly from upright unit 51a. Rollers 54 are mounted at the front of oblique unit 51b and substantially at its center, and a sprocket 56 is disposed under the frame 51. Sprocket 56 transmits power from engine 1 to chain saw 27 which extends around rollers 54 and sprocket 56. A recess portion 59 is formed in back of portion 27a of chainsaw 27 so that frame 51 does not contact branch t while cutting and create a risk of jamming.

Projecting slightly forward from roller 54 at the front of oblique unit 51b is a sensor 60 for temporarily stopping the drive of the wheels w while tree pruning machine A climbs the tree. Sensor 60 has a pin 61 for avoiding contact between sensor 60 and roller 54. Sensor 60 is pivotally secured to slide rods 62 by pins 69, and slide rods 62 are slidingly engaged by bolts 63 and capable of moving in the longitudinal direction of oblique unit 51b. Disposed rearwardly of rods 62 is a slide rod 64, the end of which is contacted by ribs 62a projecting from rods 62. A coiled spring 65 is mounted at the rear of rod 64.

FIGS. 17(a)–17(c) illustrate three cases where sensor 60 contacts the branch t. FIG. 17(a) shows the case where the branch t makes contact with the front of the sensor 60. In this case, sensor 60 linearly backs against the tension of spring 65. FIG. 17(b) shows the case where branch t contacts the lower side of sensor 60. In this case, the sensor rotates counterclockwise as it backs against the tension of spring 65. FIG. 17(c) shows the case where branch t makes contact with the upper side of sensor 60. In this case, sensor 60 rotates clockwise while backing against the tension of spring 65. Since sensor 60 is mounted rotatably and telescopically to rods 62, sensor 60 can back against the tension of spring 65 even if the branch t makes contact with either the front, lower, or upper sides of the sensor. In each case, ribs 62a push rod 64 backward. As will be described later, when sensor 60 causes rod 64 to move backwardly, the normal rotation of the wheels w by the engine 1 is temporarily stopped.

A wire 66 is mounted at the rear end of frame 51b and extends through a pipe 66 and towards anchoring plate 42 wherein it attaches to an end thereof. Plate 42 is always elastically biased by the spring S3 against the gear g12 to prevent gear g12 from rotating, but when branch t contacts sensor 60 and causes it to move backwardly and pull wire 66 in the direction of arrow p, plate 42 disengages from gear g12, as designated by chain lines in FIG. 14, thereby allowing gear g12 to rotate. In other words, the plate 42 and the gear g12 act as a power disconnecting unit for disconnecting the transmission of power from engine 1 from the wheels w.

Operation of sensor 60 shall now be described.

As was described with reference to FIG. 23, since the cutting force of the top of the cutting unit 2 is small, it is desirable to avoid contact between branch t and the top of the cutting unit 2. Sensor 60 is provided to detect contact between branch t and the top of the cutting unit 2. As shown in FIGS. 17(a)–17(c), when the branch t contacts sensor 60, sensor 60 moves backwardly against the tension of spring 65 and wire 66 is pulled in the direction of arrow p. Wire 66 disengages plate 42 from gear g12, and gear g12 rotates freely. When gear g12 rotates freely, transmission of engine 1 power to the wheels w via the ring gear G1 is interrupted, and the pruning machine falls by its own weight. When sensor 60 moves sufficiently away from branch t (as designated by a broken line in FIG. 14), it again projects forwardly of the roller 54 by the tension of spring 64. Spring S3 biases plate 42 against gear g12, gear g12 stops rotating, ring gear G1 is again pulled by the gear g12 in the direction of arrow X, power is transmitted to wheels w, and the pruning machine A again climbs the tree T. Now branch t will be cut by the front side 27a of the chain saw 27.

In summary, when the branch t contacts sensor 60, the drive of the wheels w in the tree climbing direction is temporarily interrupted, the pruning machine A moves down slightly by its own weight, the top of the cutting unit 2 moves away from branch t, the wheels w again start rotating, the pruning machine A climbs the tree, and the branch t is now cut by the front side 27(a) of chainsaw 27. The device prevents the top of the cutting unit 2 from jamming between the branches t and stopping the pruning work. Furthermore, by idling wheels w when cutting unit 2 is interposed between the branches t, we prevent the wheel w from tearing the bark of the tree T. Instead, the pruning machine A immediately falls and such damage does not occur.

Figure 18:
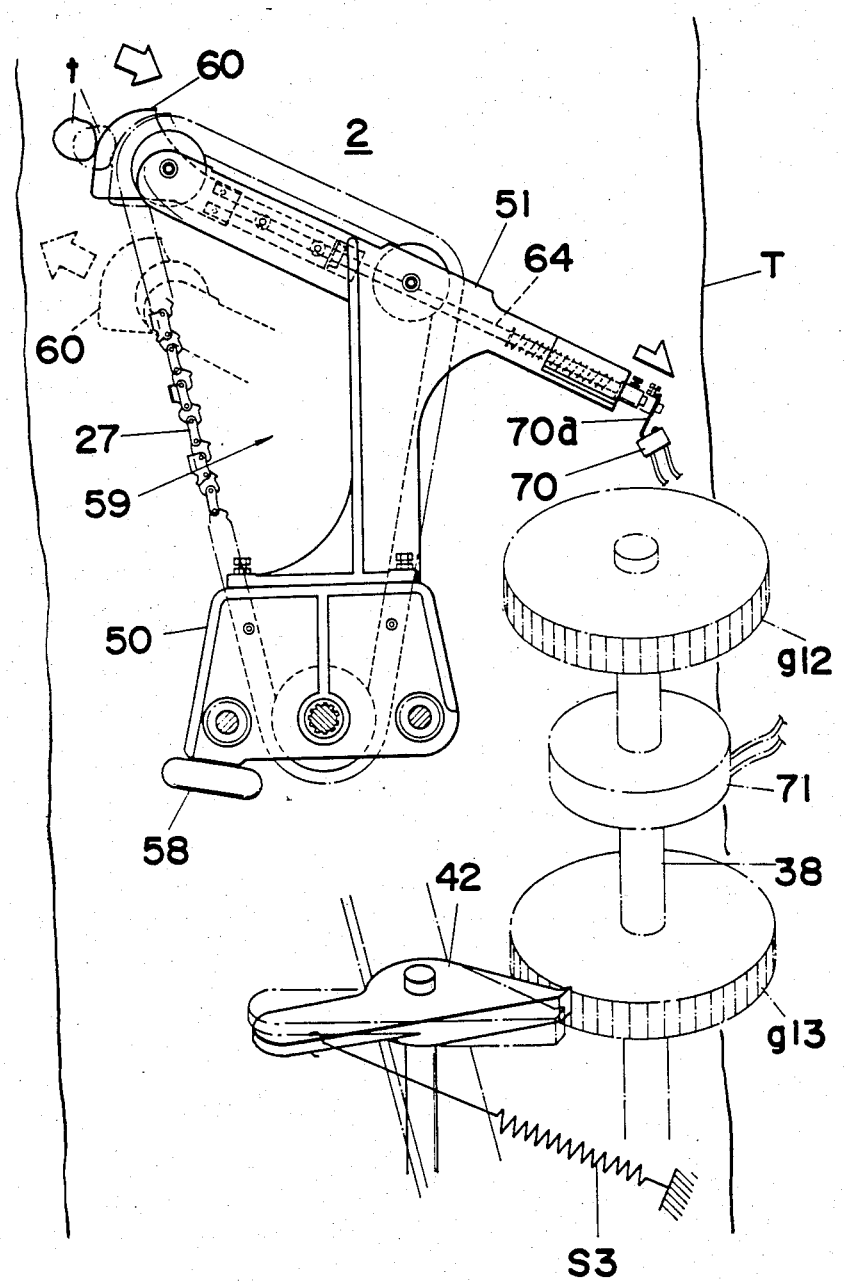
FIG. 18 is a side view of a device for temporarily stopping power transmission to the wheel units.
Figure 19:
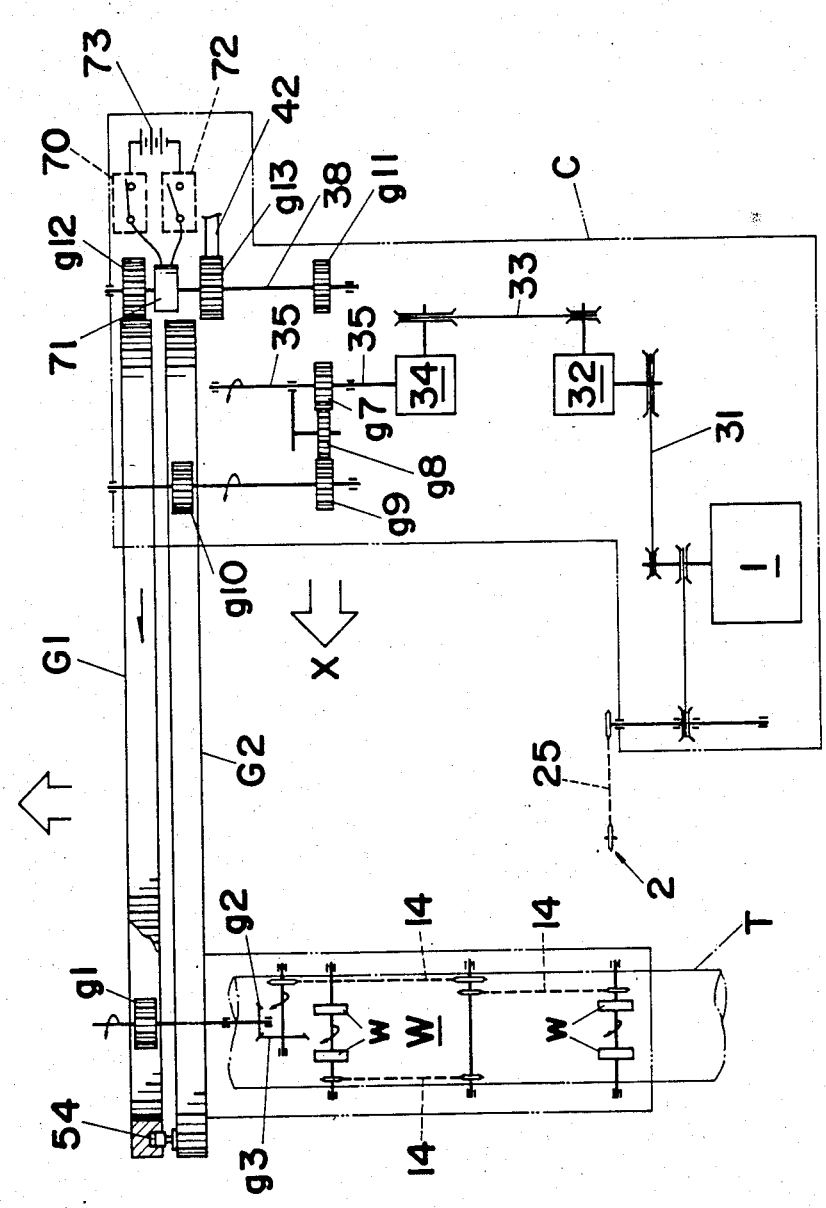
FIG. 19 is a developed view of the transmission of FIG. 18.
Figure 20:
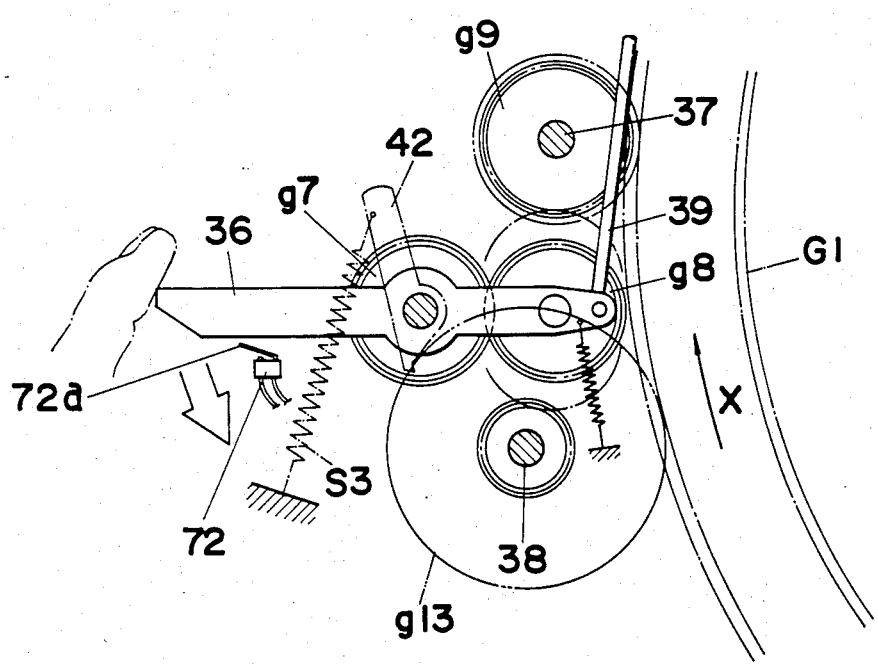
FIG. 20 is a view of the transmission setting mechanism.

FIGS. 18–20 show another embodiment of a tree pruning machine according to the present invention. In the embodiment, wire 66 is absent, but a normally-closed limit switch 70 having a lever 70A is arranged as a position detector at the rear of slide rod 64. An electromagnetic clutch 71, which serves as a power interrupting unit, is mounted on shaft 38. Clutch 71 is connected to switch 70 through a normally-open limit switch 72, provided at the side of lever 36, and a power source 73. When lever 36 is turned to activate the climbing mode, switch 72 is turned on, allowing power to flow to clutch 71. Power source 73 may be a primary battery or a storage battery which is charged by a generator driven by engine 1. As shown in FIG. 19, a gear g13 is mounted on shaft 38, and plate 42 engages with gear g13.

In this embodiment, if branch t contacts sensor 60 when the pruning machine A is climbing the standing tree T, rod 64 moves rearwardly, and lever 70a turns limit switch 70 off. As a result, clutch 71 is disengaged, gear g12 idles, transmission of power to the wheels w by the ring gear G1 meshing with gear g12 is interrupted, and pruning machine A falls by its own weight. When sensor 60 is away from the branches t (designated by a broken line in FIG. 18), sensor 60 projects forwardly of roller 54 by the tension of spring 65, rod 64 moves forwardly, and lever 70a turns limit switch 70 on. Clutch 71 re-engages, ring gear G1 is pulled by the gear g12 in the direction of arrow X, power transmission to wheels w resumes, and the pruning machine A again climbs the tree T. When the pruning machine A climbs to its predetermined height, lever 36 rotates clockwise, as shown in FIG. 20 and described above, gear g8 meshes with gear g11, and pruning machine A descends tree T. In this case, limit switch 72 is turned off, clutch 71 is disengaged, and gear g12 idles.

Figure 21:
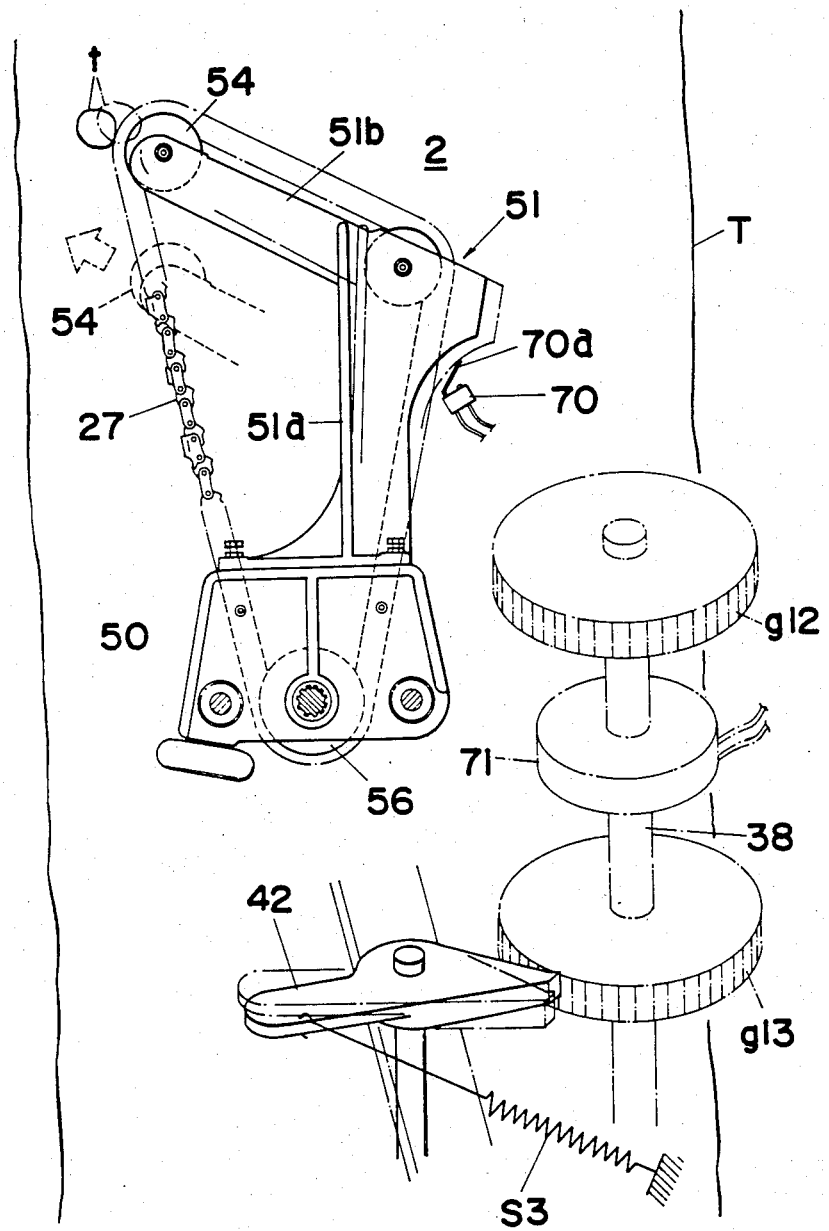
FIG. 21 is a side view of still another embodiment of a tree pruning machine according to the invention.

FIG. 21 shows another embodiment of a tree pruning machine according to the present invention. In this embodiment, sensor 60 and rods 62 and 64 are absent, and the rear of the oblique unit 51b of frame 51 is removed. Normally-closed limit switch 70 is disposed at the rear of the upright unit 51a.

In this embodiment, when the branch t contacts the top of the cutting unit 2, frame 51 is bent backwardly (as designated by chain lines in FIG. 21), lever 70a deactivates switch 70, clutch 71 is disengaged, and operation proceeds in the same manner as in the above two embodiments. In other words, in this embodiment, the cutting unit 2 itself becomes the sensor, and sensor 60 is not required.

From the foregoing it is apparent that a number of modifications may be made to the basic sensor design and still be within the scope of the present invention. As further examples, clutch 71 may be a centrifugal clutch, and transmission of the normal rotation to the wheels w may be performed by automatically rotating plate 42 by a solenoid, a servo motor, or a hydraulic device.

It is also within the scope of the present invention to obliquely mount the wheels w on the body as shown in FIG. 23. In this embodiment, a cutting unit 80 includes a chain saw 87 coupled to and tilting slightly forwardly of a frame 81. Engine 1 drives chainsaw 87 through transmission wheels 84, 85, 86, and sprocket 82. Power to the wheels w is controlled by normally-closed limit switch 70, clutch 71, and power source 73. Cutting unit 80 includes a spring 88, for elastically biasing cutting unit 80 in the position shown, and a projection 83, extending from the frame 81, for contacting lever 70a of switch 70.

In this embodiment, when the branch t contacts the top of the cutting unit 80, cutting unit 80 rotates clockwise, as designated by chain lines in FIG. 22. Projection 83 pushes against lever 70a, and limit switch 70 is turned off. Consequently, clutch 71 is disengaged, and the transmission of power from the engine 1 to the wheels w is temporarily stopped. In other words, cutting unit 80 acts as the branch sensor. When the drive of the wheels w is thus stopped, pruning machine A descends slightly by its own weight, cutting unit 80 tilts forwardly, lever 70a disengages from limit switch 70, switch 70 turns on, and clutch 71 energizes. Wheels w are again driven by engine 1, and pruning machine A resumes its normal operation.

The invention has now been described with reference to specific embodiments. Various modifications and substitutions will be apparent to persons skilled in the relevant arts. Accordingly, it is not intended that the invention be limited except as provided by the appended claims.

What is claimed is:

1. A method for pruning a tree with a device having a body, wheels for elevating the body, a cutting unit mounted on the body, means for driving the wheels and the cutting unit, and a sensor mounted on the top of the cutting unit for detecting branches comprising the steps of:

detecting a branch with the sensor; and
   temporarily stopping the wheel driving means in a tree climbing direction when the branch is detected.

2. A tree pruning machine comprising:
   a body;
   a plurality of wheels rotatably coupled to the body for elevating the body on a standing tree;
   a cutting unit disposed on the body for cutting branches;
   means for driving the wheels and the cutting unit;
   a sensor disposed on the top of the cutting unit for detecting branches; and
   means, response to the branch sensor, for temporarily stopping the wheel driving means.

* * * * *